L. HOLLAND-LETZ.
MOTOR ATTACHMENT FOR HARVESTERS.
APPLICATION FILED MAY 8, 1911.

1,014,823.

Patented Jan. 16, 1912.

2 SHEETS—SHEET 1.

Witnesses:
C. C. Palmer.
F. W. Hoffmeister.

Inventor.
Lud Holland-Letz.
By E. W. Burgess
Attorney.

L. HOLLAND-LETZ.
MOTOR ATTACHMENT FOR HARVESTERS.
APPLICATION FILED MAY 8, 1911.

1,014,823.

Patented Jan. 16, 1912.
2 SHEETS—SHEET 2.

Witnesses
C. C. Palmer.
F. W. Hoffmeister.

Inventor.
Lud Holland-Letz.
By E. W. Burgess
Attorney.

UNITED STATES PATENT OFFICE.

LUD HOLLAND-LETZ, OF CHICAGO, ILLINOIS, ASSIGNOR TO INTERNATIONAL HARVESTER COMPANY, A CORPORATION OF NEW JERSEY.

MOTOR ATTACHMENT FOR HARVESTERS.

1,014,823.  Specification of Letters Patent.  Patented Jan. 16, 1912.

Application filed May 8, 1911. Serial No. 625,739.

*To all whom it may concern:*

Be it known that I, LUD HOLLAND-LETZ, a citizen of the United States, residing at Chicago, in the county of Cook and State of Illinois, have invented certain new and useful Improvements in Motor Attachments for Harvesters, of which the following is a specification.

My invention relates to motor attachments for harvesters of the class wherein the motor is mounted upon a platform connected with the rear part of the harvester frame, and consists in providing an improved caster wheel supporting mechanism that is flexibly connected with the motor platform in a manner whereby the latter and the harvester may be tilted about the axis of the traction wheel of the harvester, and a spring counterbalancing mechanism connecting the motor platform with the caster wheel supporting mechanism; the object of my invention being to provide an attachment that may be connected to harvesters of a common form in a manner to assist the traction wheel in transmitting motion to the operative parts of the harvester and to support the rear side of the harvester in an adjustable manner. I attain these objects by means of the mechanism illustrated by the accompanying drawings, in which—

Figure 1:
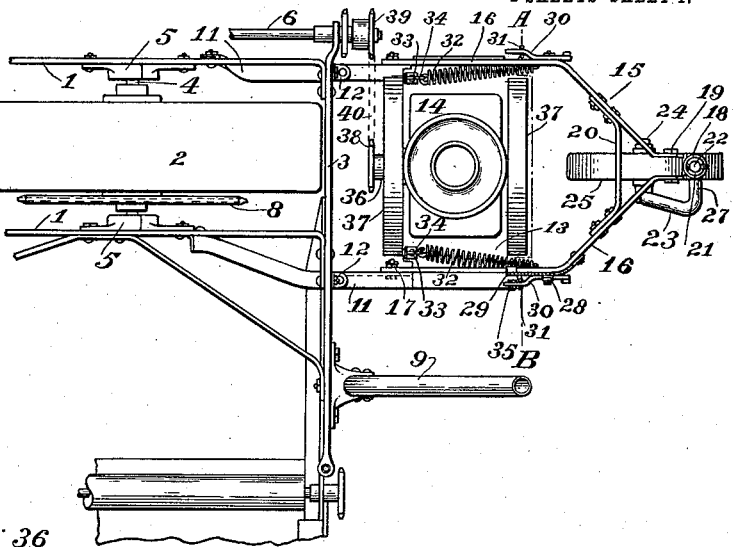
Figure 3:
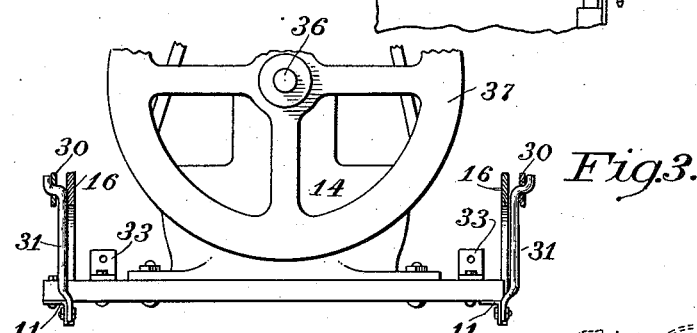
Figure 2:
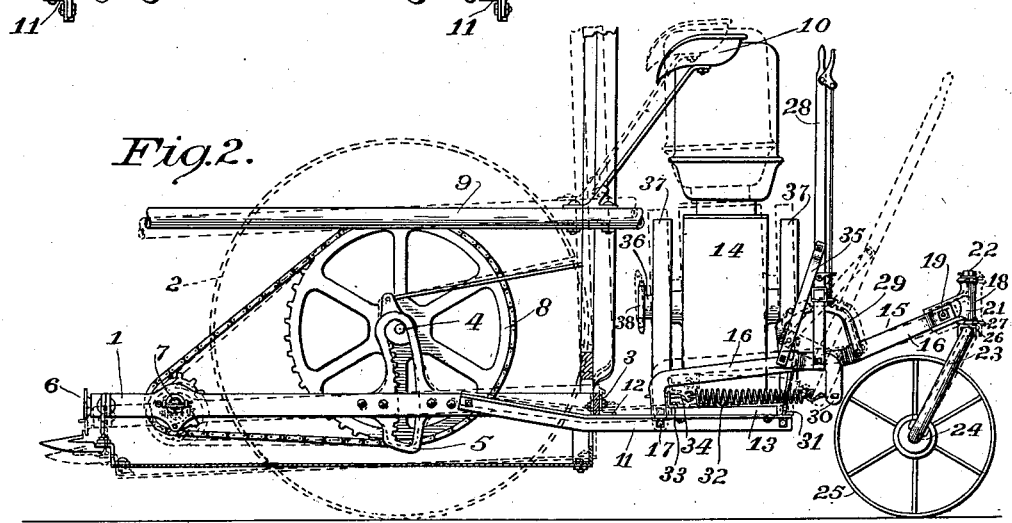
Figure 4:
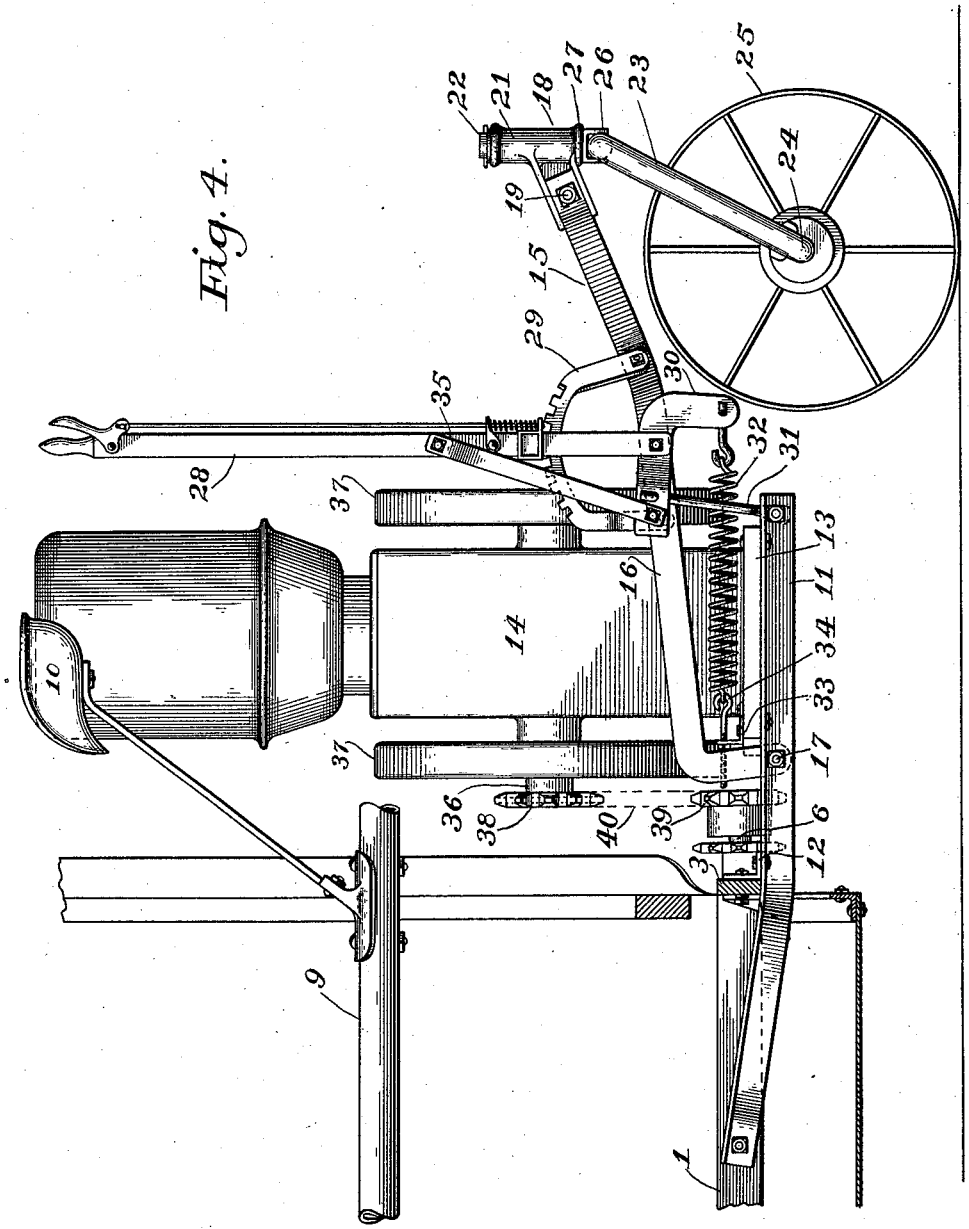

Figure 1 is a top plan view of a part of the rear side of the wheel frame of a harvester having my improved motor attachment connected therewith; Fig. 2 is an end elevation of Fig. 1, showing the manner in which the harvester may be tilted about the axis of the traction wheel relative to the caster wheel supporting mechanism connected with the motor platform; Fig. 3 is a cross section of Fig. 1 along line A—B, designed to illustrate the manner of connecting the motor frame with the caster wheel supporting mechanism; and Fig. 4 represents, on an enlarged scale, a side elevation of the motor and its supporting platform, a part of the harvester frame and the caster wheel and its supporting frame.

The same reference characters designate like parts throughout the several views.

1 represents wheel frame members upon opposite sides of the harvester traction wheel 2, and 3 a wheel frame member in rear of the traction wheel and secured to members 1, the traction wheel being supported upon an axle 4, the wheel frame being adjustable from a lower to a higher plane relative to the axle in a common way by means of side castings 5 secured to wheel frame members 1 upon opposite sides of the wheel.

6 represents the harvester crank shaft located upon the stubbleward side of the wheel frame, and 7 a cross shaft in front of the traction wheel that is driven from a sprocket wheel 8 secured to the traction wheel.

9 represents a seat supporting pipe forming part of the harvester frame, and 10 an operator's seat carried thereby.

11 represents rearwardly extending motor platform bars upon opposite sides of the traction wheel of the harvester, having their forward ends secured to the wheel frame members 1 and their middle portions to the wheel frame member 3 by means of clips 12, and 13 represents a plank secured to the rear ends of the bars, upon which is mounted a motor 14.

15 represents a rearwardly extending frame including side members 16, having their forward ends turned downward and pivotally connected with the motor platform bars 11 at 17, the members 16 extending rearwardly and upwardly in parallel relation a short distance in rear of the motor platform and then incline upward and toward each other and have their rear ends secured to a caster wheel supporting bracket 18 by means of a bolt 19, and 20 represents a transverse bar arranged in front of the bracket, having the opposite ends thereof secured to the side members 16. The bracket 18 is provided with a vertical sleeve portion 21, in which is journaled the vertical stem 22 of a caster wheel supporting arm 23 that has an axle portion 24 at its lower end, upon which is journaled a caster wheel 25, and 26 represents a washer arranged between the lower end of the sleeve and a shoulder portion 27 upon the arm.

Pivotally connected with one of the side members 16 near its middle portion is a hand lever 28 having a common form of detent mechanism associated with a notched sector rack 29 secured to the arm and operative to secure the lever in any position of adjustment in a well-known way.

30 represents bell crank levers pivotally connected with the members 16 upon opposite sides of frame 15, and having their axes preferably in line with the axis of the pivotal connection of the hand lever; said bell crank levers having one arm projecting forward in the direction of the line of draft and the other downward, the forwardly extending arm being connected with the motor platform by means of links 31, and the downwardly extending arm with the motor platform by means of counterbalancing springs 32, that have their rear ends adjustably connected to clips 33 by means of eye bolts 34, the clips being secured to the motor platform.

35 represents a brace member connecting the forward end of one of the bell crank levers with the hand lever.

The motor includes a main shaft 36, upon which are secured fly wheels 37, and upon the forward end of said shaft is secured a sprocket wheel 38.

39 represents a sprocket wheel forming part of the clutch mechanism mounted upon the rear end of the crank shaft of the harvester, and 40 a sprocket chain connecting the sprocket wheels 38 and 39, the motor transmitting motion to the operative parts of the harvester by means of the associated connecting mechanism.

The operator may tilt the frame of the harvester about the axis of its traction wheel by manipulating the hand lever 28 forward. The rearward end of the lever being connected with one of the bell crank levers will cause the latter to rock about its pivotal connection and, through its link connection with the motor frame, which is rigid with the harvester frame, cause it to approach or recede from the caster wheel supporting frame and raise or lower the rear side of the harvester frame, the counterbalancing spring assisting the hand of the operator.

What I claim as my invention, and desire to secure by Letters Patent, is:

1. A motor attachment for harvesters including, in combination, a motor platform rigidly secured to the frame of a harvester at its rear side, a motor mounted upon said platform, a supplemental frame having its forward end pivotally connected with the motor platform, a caster wheel journaled upon a supporting arm, said arm having a pivotal connection with the rear end of said supplemental frame, and means mounted upon said supplemental frame and connecting said motor platform with said supplemental frame and operative to raise or lower said motor platform relative to said caster wheel.

2. A motor attachment for harvesters including, in combination, a motor platform rigidly secured to the frame of a harvester at its rear side, a motor mounted upon said platform, a support for the rear end of said platform pivotally connected therewith and including a caster wheel mechanism, a hand lever mounted upon said support and means connecting said platform with said hand lever whereby the rear end of said platform may be raised or lowered relative to said caster wheel.

3. A motor attachment for harvesters including, in combination, a motor platform including rearwardly extending side frame members having their forward ends rigidly secured to a harvester frame, a supplemental frame including side members having their forward ends pivotally connected with the side members of said motor platform and their rear ends inclined upward, rearward and inward, a caster wheel, a supporting arm having said caster wheel journaled thereon, a bracket secured to the rear ends of said supplemental frame members, a vertically arranged sleeve forming part of said bracket, said supporting arm being journaled in said sleeve, a hand lever mounted upon said supplemental frame and flexibly connected with said platform, said lever being operative to raise or lower said motor platform relative to said caster wheel.

4. A motor attachment for harvesters including, in combination, a motor platform including rearwardly extending side frame members having their forward ends rigidly secured to a harvester frame, a supplemental frame including side members having their forward ends pivotally connected with the side members of said motor platform and their rear ends inclined upward, rearward and inward, a caster wheel, a supporting arm having said caster wheel journaled thereon, a bracket secured to the rear ends of said supplemental frame members, a vertically arranged sleeve forming part of said bracket, said supporting arm being journaled in said sleeve, a hand lever mounted upon said supplemental frame, bell crank levers pivotally mounted upon the side members of said supplemental frame, links connecting one arm of said levers with said motor platform, and counterbalancing springs connecting the other arm with said motor platform, and a link connection between one of said bell crank levers and said hand lever whereby the operator may manipulate the hand lever in a manner to raise or lower said motor platform relative to said caster wheel.

LUD HOLLAND-LETZ.

Witnesses:
MARTIN J. KUBALANZA,
CHARLES B. RUHLEY.

---

Copies of this patent may be obtained for five cents each, by addressing the "Commissioner of Patents, Washington, D. C."